_(Pagination: col. 1, col. 2)_

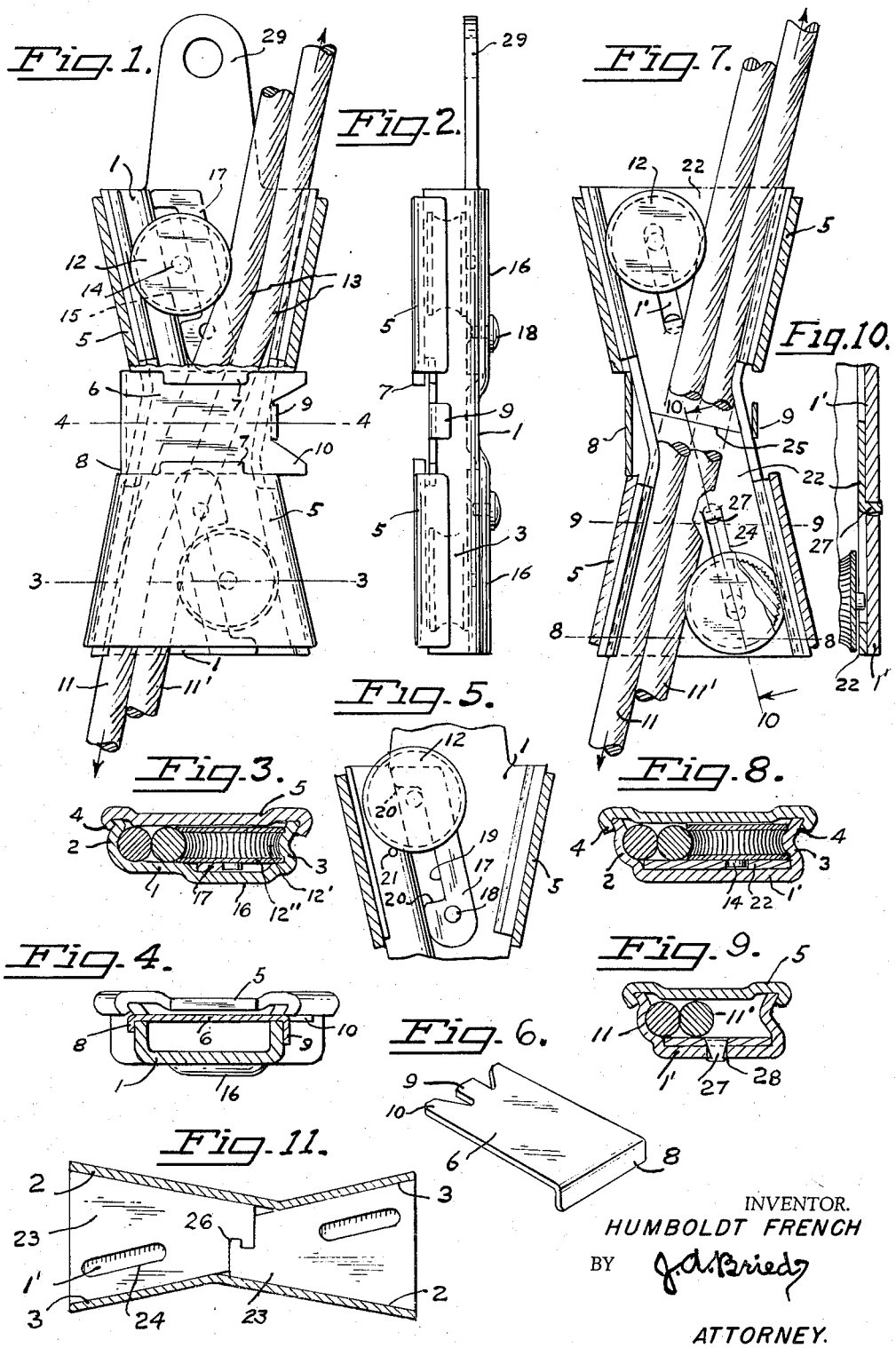

United States Patent Office 2,988,795
Patented June 20, 1961

2,988,795
CABLE CLAMP
Humboldt French, 320 62nd St., Oakland, Calif.
Filed Oct. 20, 1958, Ser. No. 768,391
10 Claims. (Cl. 24—126)

This invention relates to clamps for securing two bights of a cable together to form a loop or for securing two sections of a cable together against slippage when under a strain even beyond the breaking point of the cable.

More particularly the present invention relates to specific improvements in a cable clamp of the type shown in my U.S. Patent No. 2,606,350 of August 12, 1952, and has for its principal objects a construction easier to manufacture, one which will hold more securely, and in which the cover sections of the shell body of the clamp are locked against any possible displacement. Other advantages of the improved construction will appear in the description.

In the drawings accompanying this specification the improvements together with variations thereof are shown, and in which drawings FIG. 1 is a plan view of the complete clamp with two bights of a cable clamped in place and with the outer side of one of the two cover plates cut away to show the cables within the body shell.

FIG. 2 is a side view of FIG. 1.

FIG. 3 is a cross section of FIG. 1 taken along the line 3—3 thereof, but with the gripping roller shown in full.

FIG. 4 is a cross section of FIG. 1 taken along the line 4—4 thereof and showing the cover locking plate in locked position, and omitting the cables.

FIG. 5 is a plan view of the upper portion of FIG. 1 with the cables omitted and showing the roller-pin slot or guide-forming insert strip, and also the nail hole for temporarily holding the clamping or gripping roller in released position.

FIG. 6 is a detached perspective view of the cover locking plate.

FIG. 7 is a plan view similar to that of FIG. 1 but with both cover plates cut off to better show an optional straight run of the cable bights through the shell, and a modification of the gripping roller guiding groove and slot construction.

FIG. 8 is a cross section taken along the line 8—8 of FIG. 7, but showing the roller in full.

FIG. 9 is a cross section taken along the line 9—9 of FIG. 7.

FIG. 10 is a fragmentary cross section of FIG. 7 taken along the line 10—10 thereof.

FIG. 11 is a plan view of the lower part only of the body shell as of FIG. 7 showing a variation in the manner of holding the roller guiding slot plates in place.

In further detail, the clamp comprises, an open body shell designated 1 in FIGS. 1 to 5, and 1' in FIGS. 7 to 11.

The shell or casing, 1, as in my prior patent referred to, tapers from opposite ends to narrower in the central area, and is formed with short side walls 2, 3, hooked outwardly at their outer edges to receive the inwardly hooked edges 4 of the cover plates 5 which may be separately applied in the central area and are tapered to match the taper of the shell so as to fit tightly when slid to the opposite ends respectively of the shell, and then so locked in place by a locking plate 6 which may be laterally slid into place under the overhanging confronting ends 7 of the cover plates 5 until a stop flange 8 at one end of the locking plate contacts the shell, and then an extending ear 9 is bent downwardly to prevent the locking plate from accidentally coming out, and thus positively locking the two cover plates 5 in place on the shell, though lugs 10 are provided on the locking plate for driving it outward after its locking ear 9 has been bent to its original position, when desiring to remove it.

In both variations the two bights 11 and 11' of the cable are shown jammed against the concaved side wall of the shell by the gripping rollers 12 which are concaved on their rims to fit the cable, also sharply knurled both in their concave surfaces 12' as well as on their marginal extending edges 12" and all of hardened steel or hard alloy, and the wall 2 of the shell or casing contacting the cable is preferably also similarly knurled or roughened, as is also the opposite wall 3 which is complementally formed to fit the concavity of the roller and recessed to receive its marginal extending edges, as clearly shown to the right of FIG. 4, so that as a strain is applied to the cable bights in the direction indicated by the arrows the gripping rollers will tend to move inward toward the narrower portion of the tapering walls 2 and 3 and thus jam the bights together as well as against the opposite wall, all as explained in my previous patent mentioned.

In FIG. 7, the cable contacting walls being parallel with the run of the cables, the cables will be crushed to a considerable degree where contacted by the gripping rolls if the pull is very heavy, but in FIG. 1 the walls contacting the cables are out of parallel with the run of the cables so that the pressure exerted by the gripping rollers forces the cables out of line as indicated at 13 in FIG. 1, and thereby additionally prevents the cables from slipping. This principle may be augmented to any degree desired by deforming the wall.

As it is desirable to reduce the number of loose parts to the minimum, it is preferable that the rollers have integral or tightly driven in center pins 14 projecting from the bottom side only into a guiding and retaining groove 15 which was found difficult to form in a cold steel plate stamping (and a through slot was not wanted), I have depressed a considerable portion of the shell as shown at 16 in FIG. 3 and inserted a slot defining strip of sheet metal 17 riveted or spot welded in place as at 18. This strip is flush with the inner bottom of the shell and has a straight edge 19 for guiding the roller pin against the side wall of the shell, and a limit stop 20 at both ends, so the roller cannot fall out of position. Also a nail hole 21 drilled through the shell provides for insertion of a nail or pin to temporarily hold the roller in cable releasing position while putting the cables in place.

Instead of the small inserted strip 17 a continuous false bottom plate or plates may be forced snugly into the open shell as shown at 22 in FIGS. 7–9 or in FIG. 11 at 23. Such a plate may be of thick sheet metal with the roller pin guiding slots 24 cut or stamped right through it as shown in FIGS. 7 and 11 and had best be in two pieces in endwise abutting relation as by an angular line 25 in FIG. 7 or in hooked engagement as at 26 in FIG. 11 as the two piece construction permits each half with its roller with its pin in place to be canted when inserting to bring the lower extending edge of the roller under the inwardly curved side wall 3 of the shell to position shown in FIG. 8.

It will be noticed that the hooked engagement 26 of the plate sections 23 of FIG. 11, and the angular joint 25 of FIG. 7 both prevent any pulling out lengthwise of any plate section, and if they are a snug fit forced into the shell they will stay flat in place, but if desired it is obvious they may be spot-welded in place, or flush riveted, or when punching out the slots 24 a tongue 27 may be forced downwardly at the end of each slot and this tongue forced through a hole 28 in the shell as a rivet, as shown in FIGS. 7, 9, and 10.

The shell is of a size to just freely permit the rollers to operate, and also contact the cables top and bottom, and while there is some latitude in the exact size of cables a given size clamp will operate properly with, it should be noted that a variation in the diameter of the rollers and/or the thickness of the insert slot plates 22 will make a given clamp fit perfectly several sizes of cables, and the herein described improvements have been devised to get improved operation as well as to facilitate the manufacture of the clamp from sheet steel by cold stamping, tho it may be made of malleable castings, all suitably galvanized or otherwise rust proofed.

While I show the clamp as arranged to simultaneously grip two bights of a cable, it is obvious it may be proportioned to hold more strands or but one only. Also that the shell of the clamp may be formed with one or more suspending or attaching loops or lugs as shown at 29.

Having thus described my improvements in a cable clamp of this type, what I claim is:

1. In a cable clamp of the type having an elongated substantially flat body shell through which a pair of cable bights can be passed and which shell is provided with fixed side walls tapering inwardly from opposite ends of the shell and a pair of detachable cover-plates slidably engaging over said walls and formed to tightly grip the margins thereof when engaged thereover centrally of the shell and moved respectively to a spaced endwise relation toward opposite ends of said shell, the improvement which comprises a locking member formed to contact the confronting ends of said so positioned cover plates for locking them in place.

2. In a structure as set out in claim 1 said member comprising a metal plate of a size to be forced tightly between said confronting ends.

3. In a structure as set out in claim 1 said member comprising a metal plate of a size to be forced laterally between said confronting ends, and said cover plates being formed with confronting edges overlying said metal plate.

4. In a structure as set out in claim 1 said member comprising a metal plate of a size to be forced between said confronting ends, and said metal plate being provided with a stop shoulder, and having a portion adapted to be bent over against the body shell to lock it in final position.

5. In a cable clamp of the type comprising a substantially flat body wall with two curved side walls forming an open ended shell through which a cable may be passed and a cable contacting wedging roller arranged to roll along at an angle to the normal run of the cable through the shell to thereby wedge the cable against a side wall of the shell as the cable is pulled, the improvement which comprises said roller provided with a rigid central pin extending from its side adjacent the shell, and a separate slotted guide for said pin inserted within said shell said roller having its periphery curved in conformity with the curve of one of said side walls and in engagement therewith during operation of the cable clamp.

6. In a structure as set out in claim 5, said slotted guide being a plate substantially coextensive with the body wall of said shell.

7. In a structure as set out in claim 5 said guide forming one side wall and ends of the slot only and inserted into a depression formed in the body wall of the shell.

8. In a cable clamp of the type having a substantially flat body shell through which a cable may be passed and a cable contacting wedging roller arranged to roll along at an angle to the normal run of the cable through the shell to thereby wedge the cable against a side wall of the shell as the cable is pulled, a cover plate arranged to lock over said shell so as to embrace the cable therebetween, the improvement which comprises a flat plate formed to fit within and against said body shell in a plane extending at right angles to the axis of said roller and against endwise removal and of a thickness to compensate for a cable diameter materially smaller than the space between the shell and cover plate.

9. In a structure as set out in claim 5 said guide being a flat plate formed to lock within the shell against lengthwise withdrawal.

10. In a structure as set out in claim 5 said guide being a flat plate in two sections formed to lock together within the shell against lengthwise withdrawal.

References Cited in the file of this patent

UNITED STATES PATENTS

| | | |
|---|---|---|
| 1,076,851 | Welshans | Oct. 28, 1913 |
| 1,271,912 | Kemper | July 9, 1918 |
| 1,366,007 | Kemper et al. | Jan. 18, 1921 |
| 1,811,942 | Kemper et al. | June 30, 1931 |
| 1,950,893 | Kemper | Mar. 13, 1934 |
| 2,606,350 | French | Aug. 12, 1952 |
| 2,657,890 | Atkins | Nov. 3, 1953 |

FOREIGN PATENTS

| | | |
|---|---|---|
| 24,455 | Great Britain | 1901 |
| 454,358 | Canada | Feb. 1, 1949 |